(12) United States Patent
Khawand et al.

(10) Patent No.: US 7,003,303 B2
(45) Date of Patent: Feb. 21, 2006

(54) DEDICATED HIGH PRIORITY ACCESS CHANNEL

(75) Inventors: Charbel Khawand, Miami, FL (US); Jean Khawand, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/227,118

(22) Filed: Aug. 23, 2002

(65) Prior Publication Data

US 2004/0192320 A1 Sep. 30, 2004

(51) Int. Cl.
*H04Q 7/20* (2006.01)
(52) U.S. Cl. ............... 455/452; 455/464; 455/341; 455/512; 455/41.2; 455/448; 455/450; 455/574; 455/414.1; 455/404.1; 370/439; 370/431
(58) Field of Classification Search ............ 455/452, 455/464, 34.1, 512, 41.2, 452.1, 448, 450, 455/524; 329/61; 370/439, 431, 258
See application file for complete search history.

(56) References Cited

U.S. PATENT DOCUMENTS

| | | | |
|---|---|---|---|
| 5,507,008 A * | 4/1996 | Kanai et al. ............... 455/512 |
| 6,295,284 B1 | 9/2001 | Maggenti |
| 6,339,713 B1 * | 1/2002 | Hansson et al. ............ 455/574 |
| 6,356,767 B1 | 3/2002 | Froula |
| 6,360,103 B1 * | 3/2002 | Veerasamy ............... 455/512 |
| 6,374,099 B1 | 4/2002 | Bi et al. |
| 6,631,269 B1 * | 10/2003 | Cave ......................... 455/450 |
| 6,868,273 B1 * | 3/2005 | Cave ......................... 455/450 |
| 2004/0033807 A1 * | 2/2004 | Cave ......................... 455/450 |

FOREIGN PATENT DOCUMENTS

JP 402056157 * 2/1990

* cited by examiner

*Primary Examiner*—Joseph Feild
*Assistant Examiner*—David Q. Nguyen
(74) *Attorney, Agent, or Firm*—Scott M. Garrett

(57) ABSTRACT

The invention relates to a system and method for use in wireless packet data mode communications for facilitating communications between one or more remote devices and a base target device. The invention provides a high priority access channel (406) that can be utilized by specifically enabled packet data capable remote units (102), to perform random access channel request from a base station (106) when there is overloading on the standard communication channel (404).

3 Claims, 4 Drawing Sheets

DEDICATED HIGH PRIORITY ACCESS CHANNEL

FIELD OF THE INVENTION

The invention relates to wireless system communications. More particularly, the invention relates to facilitating communication from prioritized remote units that utilize packet data, to a base station on a dedicated priority channel.

BACKGROUND OF THE INVENTION

The wireless industry has grown at a tremendous pace over the past few years. Wireless communication has become a standard part of every day life. Most people utilize some variant form of wireless communications such as Global System for Mobile communication (GSM), Universal Mobile Telecommunications System (UMTS), Carrier Detection Multiple Access (CDMA) and 802.11 in various aspects of daily living.

Generally, radio systems are designed for a certain area of coverage or footprint. These areas are generally referred to as cells. Cells enable the reuse of similar frequencies by multiple sources to support services in metropolitan areas that are some distance apart. The geographic size of cells are not necessarily consistent throughout a given area and may vary due to frequency and power level, topography of the area, time of day and so forth. Communications within these cells take advantage of a concept known as Demand Assigned Multiple Access (DAMA). DAMA enables multiple devices to access a network in a shared manner on a demand basis. Basically, devices access the network on a first come, first serve basis. Within a wireless network, there are a number of ways in which multiple access can be provided to end-users. At the most basic level, there is a Frequency Division Multiple Access (FDMA) methodology, which is essentially the starting point for all wireless communications, given that each cell must be separated by frequencies to avoid interferences among wireless devices. FDMA divides assigned frequency ranges into multiple carrier frequencies in order to support multiple conversations.

Another method that is utilized in wireless networking is the Time Division Multiple Access (TDMA), which is a digital technique that divides each frequency channel into multiple time slots. Each of the time slots within a frequency channel supports an individual device conversation. Generally speaking, services based on TDMA offer roughly three times the traffic capacity of FDMA services.

Yet another communication methodology which is relatively new and has its root in spread spectrum radio is known as Code Division Multiple Access (CDMA). Spread spectrum radio spreads the bandwidth of a transmitted signal over a spectrum of radio frequencies. The combined spectrum of radio frequencies is usually much wider than what is required to support the narrow band transmission of the signal. Spread spectrum uses two techniques namely, Direct Sequence (DS) and Frequency Hopping (FH). In brief, direct sequence spread spectrum is a packet radio technique in which the narrow band signal is spread across a wider carrier frequency band. In other words, the signal information is organized into packets, each of which is transmitted across a wider carrier band frequency in a redundant manner i.e. packets are sent more than once. Multiple transmissions can then be supported. The transmissions from specific terminals are identified by a unique code such as, a 10 bit code that is pre-pended to each data packet. Frequency Hopping Spread Spectrum is generally preferred over direct sequence spread spectrum. FHSS involves transmission of short bursts of packets within the wide band carrier over a range of frequencies. Essentially, the transmitter and receiver hop from one frequency to another in a choreographed hop sequence and a number of packets are sent to each frequency. The hop sequence is controlled by a centralized base station antennae.

Regardless of the communication methodology for a given network, a certain amount of pre-configured set-up and real time set-up of communication devices will be required. One such requirement for communication between a remote/mobile unit and a base station is the set-up and configuration of certain communication parameters. For example, with packet data mode communications data rate, availability and maximum delay time for each packet communication must be set-up and negotiated between the remote unit and the base. Generally, this negotiation and configuration occurs in real time at the moment when the remote unit first initiates a communication session with the base station. Since every remote unit must access the base station, there is typically an overloading of the network particularly in large metropolitan areas. This results in an inability or at best a long delay for some remote units, which is problematic for emergency type units or dispatch units.

The availability of a method to provide access to certain remote units such as dispatch units, emergency personnel units and so on is required. The importance of improving access time can be quite dramatic depending on the mobile unit application. For instance, a dispatch unit that needs to communicate with multiple mobile units would benefit greatly from improved access to the targets. As such, there exists a need to provide a system and method to reduce the delay for time critical communications between an initiating mobile unit and other target mobile units.

BRIEF SUMMARY OF THE INVENTION

The invention relates to a system and method for use in wireless packet data mode communications, for enabling communication between a source device and one or more target devices by capturing in a control structure, one or more communication parameters during the set up of the source device and a base station. The set-up involving a series of interactive and sequenced communications between the source device and the base station. Transmitting the control structure to the one or more target devices and utilizing the control structure to contemporaneously configure the one or more target devices so that they can communicate with the source device via the base station.

DETAILED DESCRIPTION OF THE INVENTION

The invention provides a unique system and method for setting up and establishing communication between remote units and a base station. The invention is applicable in wireless communication devices that utilize packet data modes for paging or chatting.

Figure 1:
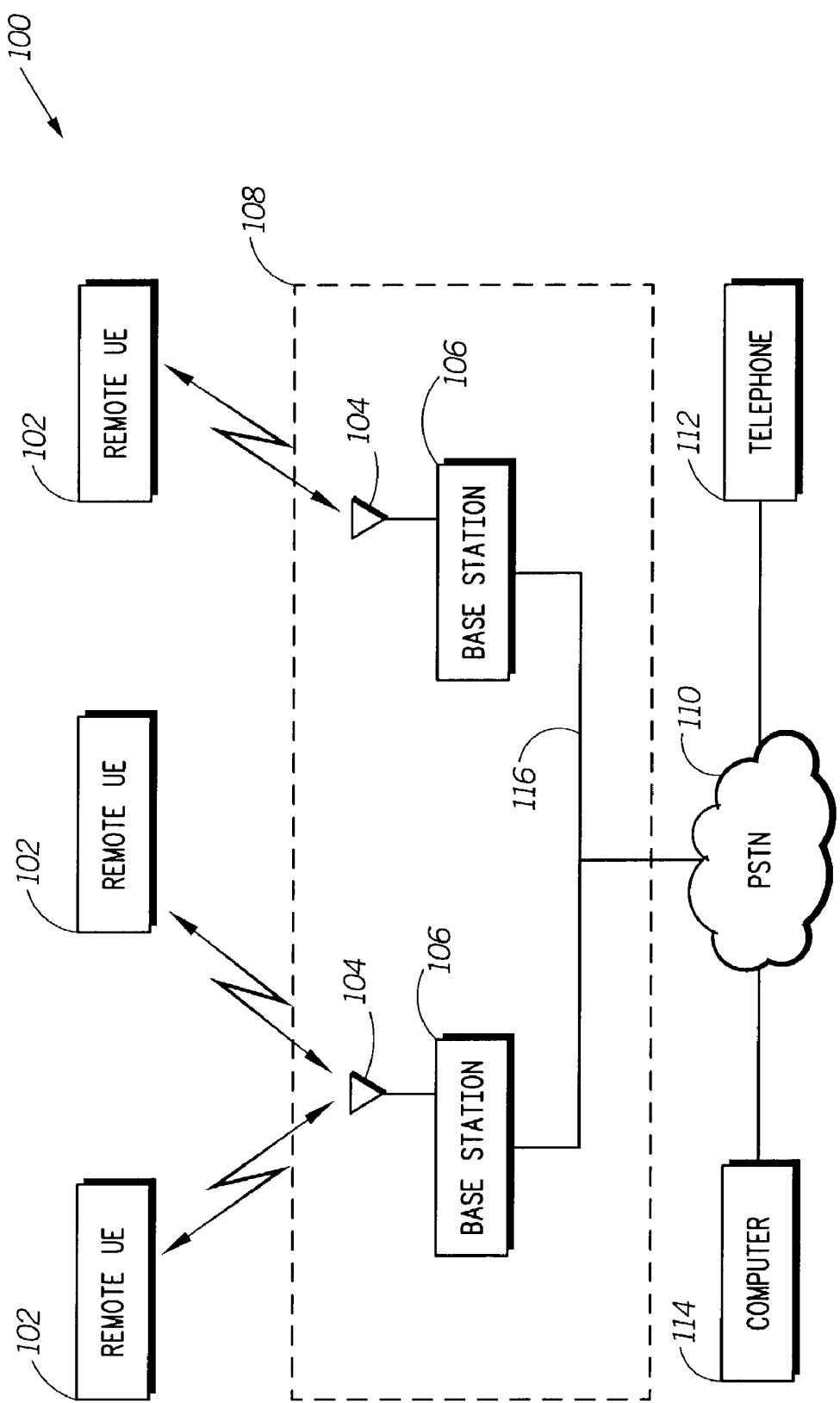
FIG. 1 is a block diagram of an exemplary wireless communication system in which the invention can be practiced.

Referring initially to FIG. 1, a blocked diagram illustrates a wireless communication system, environment in which the invention can be practiced. As shown, a fixed portion 108 includes one or more base stations 106, which provide communication to a plurality of remote user equipment 102. The base stations 106 coupled by communication link 116 preferably communicates with the user equipment 102 utilizing conventional radio frequency techniques. One or more antennae 104 provide communication from the base stations 106 to the remote user equipment 102. The base stations 106 preferably also receive RF signals from the plurality of remote user equipment units 102 via antennae 104. In an embodiment of the invention messages communicated between base station 106 and remote user equipment 102 comprise a selective addressing scheme to identify the initiating or target device. Information exchanged between base station 106 and remote user equipment 102 can include data messages, commands and adjustments to operating parameters for the communication system. Also transmitted between remote user equipment 102 and base stations 106 are responses to scheduled messages, positive acknowledgments (ACKS), negative acknowledgments (NAKS), and unscheduled messages such as registration requests and requests for items of information. It will be appreciated by those skilled in the art that other methods and schemes for wireless communication may be utilized to communicate between the base station 106 and the remote user equipment 102, or between multiple remote user equipment 102. Such methods are contemplated by and are within the scope of the invention.

The fixed portion 108 of the communications network 100 is coupled to a public switch telephone network (PSTN) 110 for receiving and sending messages to other device types like telephone 112 and computer 114. Calls or information initiated by or destined for a remote user equipment 102 can be received by or originated from a device such as telephone 112 or computer 114. Those skilled in the art recognize that alternate types of networks, for example, local area networks (LAN), wide area networks (WAN) and the Internet, can be used for receiving or sending selective call information to the wireless network 100. A computer such as computer 114 can also serve as a central repository for various applications and information utilized by the wireless communication system.

It will be further appreciated that the invention is applicable to other types of wireless communication systems including dispatch systems, cellular telephone systems and voice and/or data messaging systems. A remote communication unit that can be utilized in the invention will be discussed with reference to FIG. 2.

Figure 2:
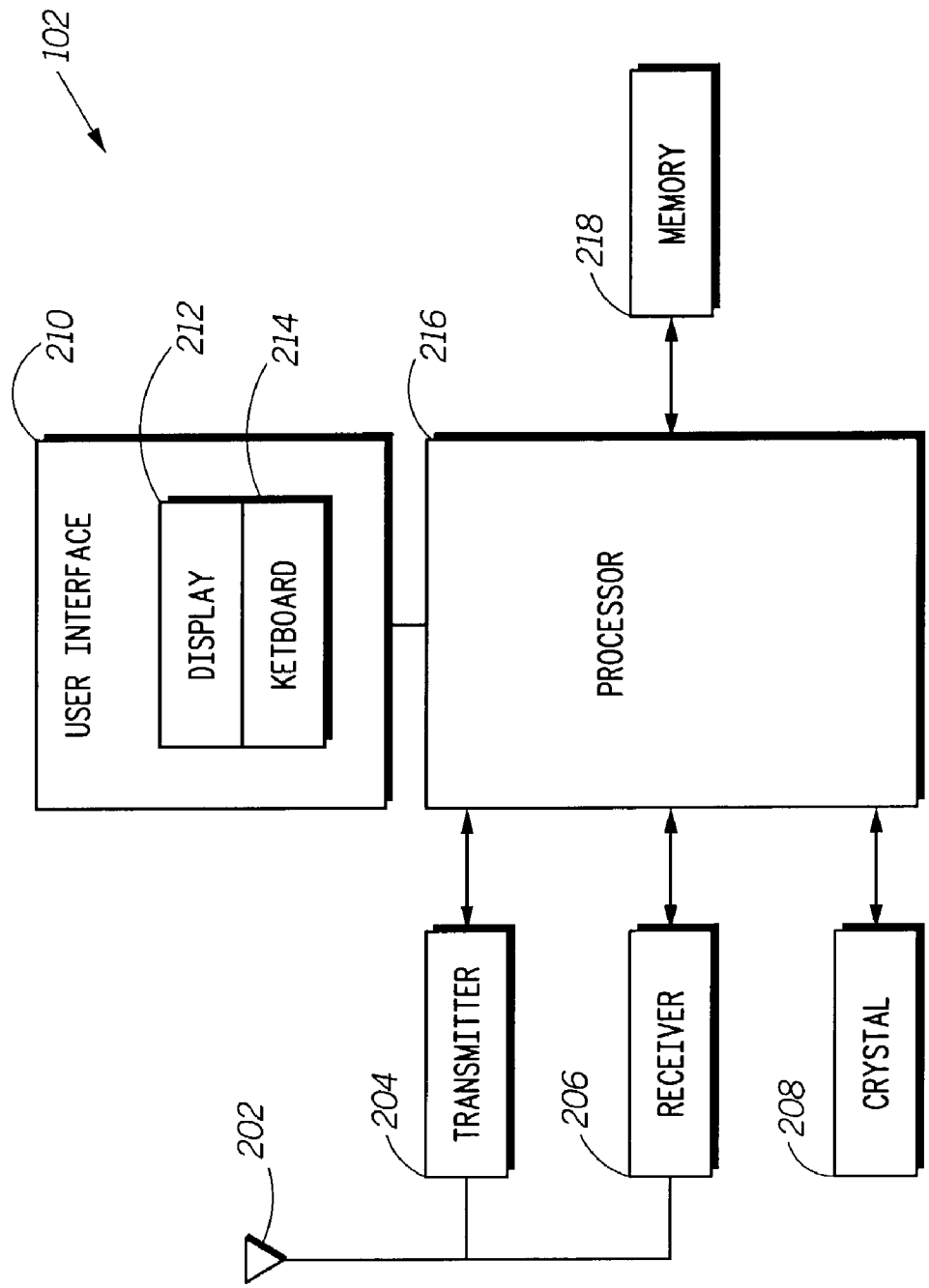
FIG. 2 is an electrical blocked diagram of an exemplary remote unit in accordance with the invention.

FIG. 2 illustrates an exemplary remote user equipment 102 and its various components. The remote user equipment 102 comprises an antennae 202 that is utilized for receiving inbound messages and for transmitting outbound messages. The antennae 202 is coupled to a transmitter 204 and a receiver 206. Both the transmitter 204 and the receiver 206 are coupled to a processor 216 for processing information relating to outbound and inbound messages and for controlling the remote user equipment 102 in accordance with the invention. A user interface 210 is operably coupled to the processor 216 for providing user interaction and feedback. In an embodiment of the invention, the user interface 210 comprises a display 212 and a keyboard 214. The display 212 provides a user with operative information and feedback from the processor 216. The keyboard 214 enables a user to provide input or response to the processor 216. Other methods and systems for user interaction and feedback could also be used to accomplish the objects of the invention. A crystal oscillator 208, provides conventional timing to the processor 216 and other components of the remote user equipment 102. Processing is performed by the processor 216 in conjunction with memory 218. The memory 218 comprises software instruction and data for programming and operating the remote user equipment 102 in accordance with the invention. Remote user equipment 102 operates to communicate to a base station 106. Such operation will be discussed in detail with reference to FIG. 3–6.

For purposes of illustration, explanation and not limitation, the invention will be discussed with reference to the UMTS environment. The invention is equally applicable and capable to be utilized in any wireless communication strategy or methodology.

Figure 3:
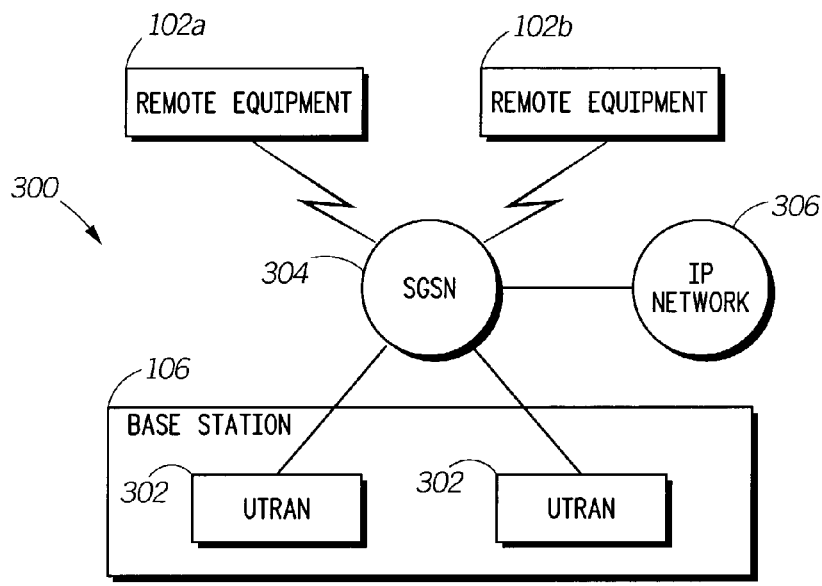
FIG. 3 is a block diagram of the service level communications on a typical wireless network.

A brief overview of the UMTS environment will be discussed with reference to FIG. 3. As shown in FIG. 3, a base station 106 comprises one or more UMTS Terrestrial Radio Access Network (UTRAN) components 302. As previously mentioned, UMTS is a packet mode communication scheme. In conjunction with UMTS there exists a General Packet Radio Service (GPRS) that provides an environment for communication between remote user equipment 102 and base station 106. GPRS provides packet routing and gateway services through a Serving GPRS Support Node (SGSN) 304. SGSN is positioned to communicate between remote user equipment 102 and UTRAN 302 of a base station 106. SGSN 304 also provides connection and communication to an IP network 306.

In operation, a remote user equipment 102 negotiates with SGSN 304 for the quality of service that will be utilized in the communication with UTRAN 302 of the base station 106. Quality of service includes such things as data rate for communications, availability, maximum time delay for packet communications and so on. The quality of service negotiation involves multiple bi-directional communications between remote user equipment 102 and base station 106 devices. The nature of these device communications will be discussed further with reference to FIG. 4A–FIG. 6.

Figure 4A:
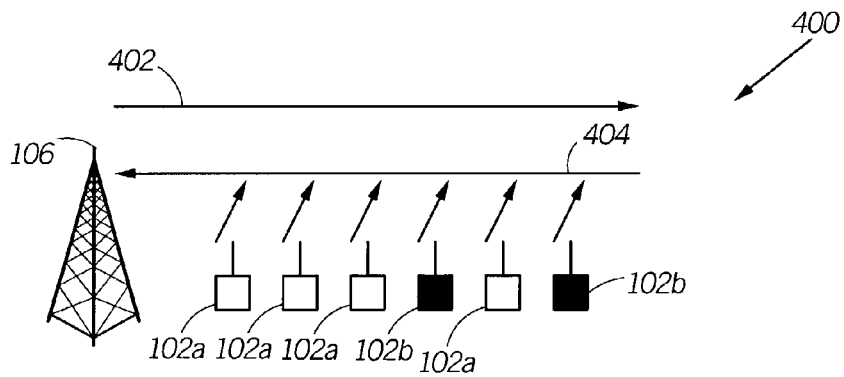
FIG. 4A is an illustration of typical broadcast scenario involving a base station, a standard communication channel and multiple remote user equipment.

Turning initially to FIG. 4A, the communication channels between a plurality of remote user equipment 102a and 102b (collectively referred to as 102) and a base station 106 are illustrated. As discussed earlier, a certain amount of negotiation must take place between the initiating user equipment 102 and the base station 106. Negotiation must also take place between the receiving user equipment 102 and the base station 106. A remote user equipment 102 attempting to access a base station 106 system does so by transmitting a "Random Access Burst" message on a dedicated channel. The dedicated channel could be a common control channel as in the case of iDEN and GSM, or could be a dedicated common RACH (Random Access Channel) 404 as in the case of UMTS. In addition, every action performed by a remote equipment 102 involves an initial communication with the base station system 106, on the dedicated RACH 404. For each base station system 106 there is only one RACH 404, which must be used by all remote equipment 102, as shown. In addition, there is a common broadcast channel 402 that is always active and constantly monitored by all remote equipment 102, which is used to communicate general information between all network devices.

By virtue of having every remote equipment 102 utilize the same RACH 404 to access the base station 106, the possibility of heavy loading and collision with other simultaneous transmissions, causes delays in access times. As discussed earlier, the use of remote equipment 102 for a variety of functions necessitate a differentiation in services. Services vary based on the Quality of Service (QoS) that is requested from the base station system 106. For example, within UMTS there are four QoS defined, namely streaming, conversation, interactive and background. Further, applications that utilize wireless data communications may also require different types of access priority. For instance, dispatch capable remotes cannot afford to wait a long time for a channel grant, while other remotes such as one executing internet browsing applications can tolerate a longer setup time.

The invention is directed at wireless communications systems and is aimed at improving the access time for time-critical services. In operation, certain remote user equipment 102b can be designated and made capable of high priority access as shown in FIG. 4A while other user equipment 102a are only capable of accessing the low priority RACH channel. This separation limits the potential for the access time delays which were previously discussed, with regards to the high priority access remote user equipment 102b. This aspect of the invention is achieved through methods that can be implemented on the remote user equipment 102, base station 106 or a combination of both. An illustration of the method, utilizing multiple priority RACH channels is shown in FIG. 4B.

Figure 4B:
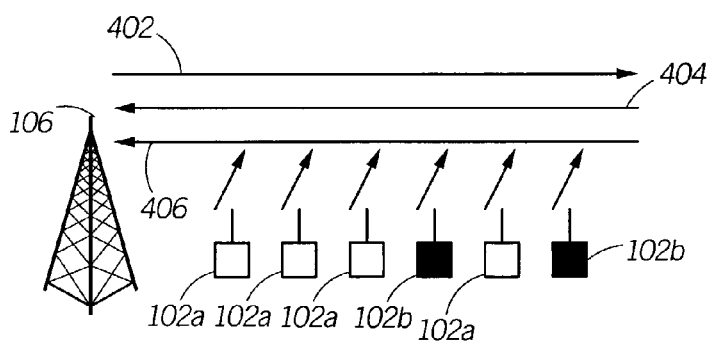
FIG. 4B is an illustration of the improved broadcast scenario of the invention, depicting a base station, alternative communication channels and multiple remote user equipment.

As shown in FIG. 4B, there is a broadcast channel 402, a low priority RACH channel 404, a high priority RACH channel 406, a base station 106 and multiple remote user equipment 102a and 102b. The broadcast channel 402, provides the medium for announcing the presence of the high priority RACH channel 406. The high priority RACH channel 406 is made available to only certain high priority RACH capable user equipment 102b. All other user equipment 102a continue to utilize the low priority RACH channel 404. The presence/assignment of the high priority RACH channel is based on criteria that will be discussed later in this document with reference to FIGS. 5 and 6. The announcement of the availability of the high priority originates from the base station 106 and is broadcast on the broadcast channel 402 to all remote user equipment 102a and 102b. However, only the high priority capable remote user equipment 102b can then access and utilize the channel, thus eliminating any connection delays for those devices.

As discussed earlier, a remote user equipment 102b that is appropriately enabled will switch and utilize the high priority RACH channel 406 when the normal low priory RACH channel 404 is overloaded or busy. The determination of accessibility to the high priority RACH channel 406 can be made in any of a number of ways, as would be understood by those skilled in the art of the invention. For instance, the base station 106 can monitor collision detection on the low priority RACH channel to determine that the channel is overloaded, the remote user equipment 102b can also sense its inability to connect on the low priority channel and provide a report to the base station 106 or the base station 106 could monitor the loading of slots on the low priority RACH channel to ascertain capacity. In either the case of the exemplified detection methods or other channel loading detection methods, the system and method of the invention will enable the base station 106 to setup the high priority RACH channel 106 and cause the appropriately equipped remote user equipment 102b to access such channel.

Figure 5:
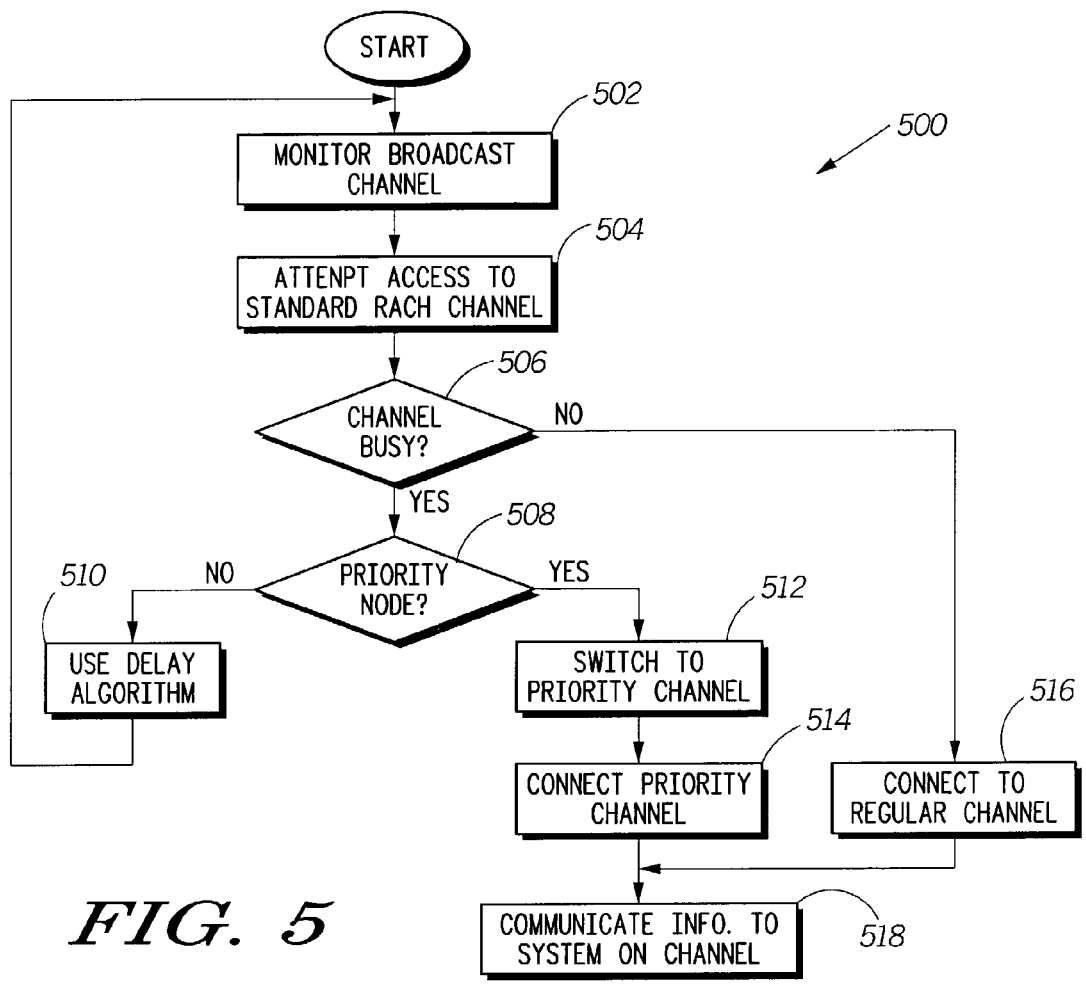
FIG. 5 is a flow diagram representing the process on a remote unit operating in the environment of the invention.

FIG. 5 illustrates a flow chart of the process on a high priority enabled remote user equipment 102b for utilizing an available high priority RACH channel in one embodiment of the invention. As with any mobile type user equipment in general, and also in the case of the remote user equipment 102b of the invention, a broadcast channel is continuously monitored as part of the normal operations. This function is shown at step 502. When a user needs to connect to either the base station or another remote unit, access is attempted with the base station on a standard RACH channel at step 504. As previously discussed, in some cases, depending on other activities on the network the RACH channel may be busy. As such, the invention involves an inquiry into the busy status of the network as shown at step 506. If the network is not busy, a connection will be made with the base station at step 516. Normal negotiations and communication will then ensue with the base station at step 518.

On the other hand, if it is determined at step 506 that the RACH channel is busy, the next course of action will depend on whether or not the remote unit that is executing the algorithm is enabled to utilize the high priority RACH channel. This determination process occurs at step 508. For remote user equipment that are not appropriately enabled, a busy network results in the implementation of one of many known forms of delay algorithms at step 510, followed by another attempt at accessing the network. However, in the case of high priority enabled remote user equipment of the invention, a busy network results in a switching on the remote user equipment to the high priority RACH channel, as shown at step 512. In other words, the high priority enabled remote user equipment will attempt to connect to the base station system on the priority RACH channel, at step 514. By virtue of the fact that only a limited number of remote user equipment will be enabled with the ability to access the high priority RACH channel in such a manner, there is a very high likely hood that a successful connection will be made to the base station on the high priority RACH channel. Consequently, at step 518, the remote user equipment will then be able to communicate to and negotiate with the base station. In order to support the ability for the remote user equipment to access the high priority RACH channel, the base station must first make the high priority RACH channel available and accept communications on that channel. This requires certain procedures on the base station and will be discussed with reference to FIG. 6.

Figure 6:
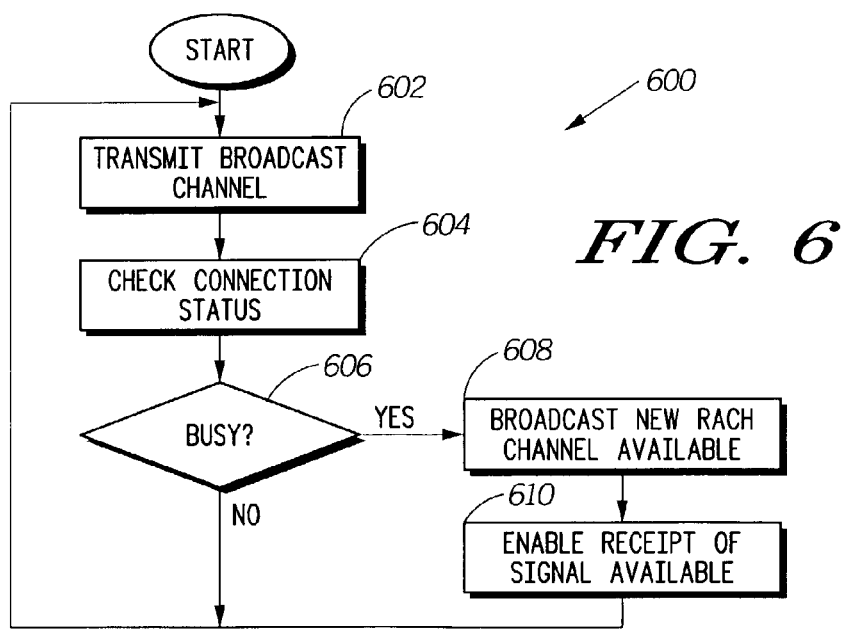
FIG. 6 is a flow diagram representing the process on a base station in an embodiment of the invention.

FIG. 6 illustrates a flow chart of the process on a base station 106 in an embodiment of the invention. Consistent with the broadcast that is received by remote user equipment there is a transmission that emanates from the base station at step 602. In conjunction with the broadcast, the base station is also cognizant of the network status, i.e. the loading of the RACH channel. This process is shown at step 604. As previously noted, the awareness of the network status can be obtained by using any one of several methods. For example, reports from remote user equipment or other network nodes, monitoring slot loading or collision detection on the network. In an embodiment of the invention, collision detection is accomplished through observing noise levels on the network.

Along with the awareness of the network status, the base station performs certain functions which vary depending on whether or not the RACH channel is too busy, at step 606. In the event that the channel is not overloaded/too busy, the base station repeats the processes discussed earlier and outlined in steps 602 through 606. On the other hand, when the RACH channel is overloaded, the base station, at step 608 setups up and broadcasts the availability of a high priority RACH channel. As previously discussed, that priority channel can then be accessed by appropriately equipped remote user equipment. The base station is then able to receive communications on the high priority RACH channel at step 610. It should be noted that the high priority RACH channel is provided in addition to the low priority RACH channel rather than as a substitute. Furthermore, the high priority RACH channel is made available only for the duration of time during which the low priority RACH channel is overloaded. In other words, high priority enabled user equipment are required to switch back to the low priority channel as dictated by network traffic.

The invention has been described in relation to particular embodiments which are intended in all respects to be illustrative rather than restrictive. Alternative embodiments will become apparent to those skilled in the art to which the invention pertains without departing from its scope.

From the foregoing, it will be seen that this invention is one well adapted to obtain all of the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

We claim:

1. A method for use in wireless packet data mode communications for providing prioritized communication between a high priority remote unit and a base station, comprising:

detecting a busy status on a first random access channel associated with the base station;

providing a second random access channel by the base station; and communicating from the base station to the high priority remote unit on the second random access channel;

wherein the second random access channel is available only while the busy status of the first random access channel is detected;

wherein the second random access channel is only accessible to high priority remote units;

wherein the base station is able to switch and communicate utilizing either of the first and second random access channels.

2. The method as recited in claim 1 further comprising, providing information regarding the availability of the second random access channel by a broadcast to the high priority remote unit from the base station.

3. A system for use in wireless packet data mode communications for providing prioritized communication between a target device and a select one or more source devices comprising:

a broadcast channel;

a first random access channel;

a second random access channel; and a channel status monitoring component;

said channel status monitoring component detecting a busy network and said second random access channel thus being made available;

wherein said broadcast channel is utilized for notifying the one or more source devices of the availability of said second random access channel;

wherein the one or more source devices utilize said second random access channel to communicate with the target device; and wherein the one or more source devices are a group that is fewer than the total number of source devices that can communicate with the base station, wherein said group have been specifically enabled to utilize said second random access channel in addition to said first random access channel.

* * * * *